United States Patent [19]

Berg et al.

[11] 3,890,245

[45] June 17, 1975

[54] PROCEDURE FOR INCREASING THE CHEMISORPTION CAPACITY OF CARBON WITH REGARD TO GASES

[75] Inventors: Ronald Berg, Oslo; Hans Petter Hjermstad, Rykkinn; Gerard Albert Neefjes, Strommen, all of Norway

[73] Assignee: Institutt for Atomenergi, Kjeller, Norway

[22] Filed: July 11, 1973

[21] Appl. No.: 378,161

[30] Foreign Application Priority Data

July 12, 1972 Norway.......................... 2482/72
June 25, 1973 Norway.......................... 2622/73

[52] U.S. Cl. ................. 252/447; 252/441; 252/443
[51] Int. Cl............................................. B01d 53/02
[58] Field of Search..................... 252/447, 441, 443

[56] References Cited
UNITED STATES PATENTS 3,217,032  11/1965  Taka................................ 252/447 X

*Primary Examiner*—Patrick P. Garvin
*Attorney, Agent, or Firm*—Watson, Cole, Grindle & Watson

[57] ABSTRACT

The present invention is related to a procedure for increasing the chemisorption capacity of carbon impregnated with metallic compounds. By a large number of tests it is amply demonstrated that such capacity may be significantly increased with regard to poisonous gases and gaseous industrial effluents simply by irradiating the impregnated carbon by gamma radiation to a dosage of at least 1 Mrad before the actual sorption process. The said chemisorption capacity may be further increased by performing the irradiation in a nitrogen atmosphere, preferably at a higher partial pressure of nitrogen than in air at atmospheric pressure.

2 Claims, No Drawings

PROCEDURE FOR INCREASING THE CHEMISORPTION CAPACITY OF CARBON WITH REGARD TO GASES

The present invention concerns a procedure for increasing the chemisorption capacity of carbon with regard to gases.

Adsorption is widely employed in industry. Physical adsorption is the more common. Chemical adsorption, or chemisorption in the following, is more specific than physical adsorption. An important application of chemisorption is by active carbon in gas masks.

A well known procedure for increasing the sorption capacity, in particular chemisorption, of active carbon in gas mask and air filters is to impregnate the carbon with heavy metals, like copper, chromium, silver, zinc, cobalt, manganese, and molybdenum.

When a toxic substance is captured by an impregnated carbon filter, the following phenomena may occur:

1. Physical sorption, typically represented by chloropicrin.
2. Chemisorption, typically represented by phosgene, cyanogen chloride, hydrogen cyanide.
3. Catalytic reaction, typically represented by arsine.

The capacity of a filter for toxic gases is measured by saturating a standard volume with an air stream containing a certain concentration of a toxic gas. The penetration time (minutes) is a measure of the capacity, and may be expressed as minutes per milliliter of filter mass, min/ml.

Using cyanogen chloride for this test is common practice. The retention of cyanogen chloride by impregnated active carbon is a typical chemisorption process. The capacity of the carbon with respect to this gas provides a measure for its power to retain other toxic gases, for example hydrogen cyanide by chemisorption.

Qualification tests for filters to be used in air raid shelters (Dräger room filters) employ the following typical specifications:

Retention of cyanogen chloride: 0.3 Kg per 25 l carbon.
Retention of hydrogen cyanide: 0.3 kg per 25 l carbon.

This corresponds to 12 mg/ml carbon for each of these gases. Our own data, Table 2, experiment no. 1, are: 0.18 min/ml, corresponding to 13 mg/ml carbon.

Carbon is employed for sorption purposes primarily in the form of active carbon, but in some cases other types of carbon, like carbon black, may be used.

Among those toxic gases one may consider removing by means of chemisorption are typical warfare gases like cyanogen chloride, chloropicrin, phosgene, hydrogen cyanide, mustard gas, and arsine, and the nerve gases "Sarin" and "Taburin." Some of those gases may also be found in industrial effluents, from which one may furthermore consider removing $SO_2$, $NO_2$, et cetera, by chemisorption.

Removal of $SO_2$ by sorption on active carbon is previously known. By reason of the severe demands for removal of $SO_2$ established by several countries in recent years, the significance of sorption has risen, since commonly used methods, like scrubbing, suffer in efficiency at low concentrations (under 100 ppm). In those cases where regeneration means higher costs or special problems, sorption without regeneration may be advantageous. In that case increasing the original sorption capacity would be particularly important.

Application of chemisorption is of course not limited to removal of toxic gases. It may also serve the purpose of gas separation, due to its good selectivity, even for gases not considered toxic.

With respect to the composition of impregnating materials and to impregnation procedures only sparse information is available. They often fall within the category of industrial or military secrets.

German Pat. (Auslegeschrift) No. 1,087,579 provides the following composition for impregnating 100 kg of granulated carbon:

| | |
|---|---|
| Copper carbonate, basic | 6 kg |
| Ammonium carbonate | 5 kg |
| Ammonia (25 percent) | 10 l |
| Potassium bichromate | 3 kg |
| Silver nitrate | 0.17 kg |
| Water | 59.5 l |

Active carbon impregnated in this manner provides particularly good protection against toxic gases like hydrogen cyanide and cyanogen chloride.

From French Pat. No. 1.575.501 is known that by impregnating active carbon with copper chromate in the presence of ethylenediamine and pyridine very high capacity for adsorption of cyanogen chloride is achieved. The patent specifies copper and chromium contents of 1.9 and 1.3 per cents, respectively.

Previously is known that the properties of solids may be changed by high-energy radiation.

For example, it has been demonstrated (Zeitschrift fur physische Chemie (Frankfurt), 72 (No. 1-3-1970) p. 44) that irradiation by a $Co^{60}$ gamma source of a catalyzer employed for hydration of carbon monoxide by Fischer-Tropsch synthesis, will reduce its efficiency.

Electron irradiation of ZnO and MgO catalyzers after heat treatment results in higher $CO_2$ sorption capacity for ZnO, but not for MgO (Ref. Izv. Akad. Nauk, Kaz, SSR, Ser, Fiz-Mat 9 (No. 2-1971) p. 56).

From British Pat. No. 1.230.950 is known to sorb $O_2$ on $SiO_2$ and bentonite while the material is being irradiated.

Neutron irradiation of a material containing carbon reduces the adsorption capacity for benzene at 20°C. (Ref. Konstr. Mater. Osn. Grafita No. 5-1970).

According to the present invention a procedure for increasing the chemisorption capacity with regard to toxic gases or industrial flue gases of carbon impregnated with one or more metallic compounds is characterized by irradiation, with a dosage of at least 1 Mrad, of the impregnated carbon prior to the chemisorption stage.

Our experiments have shown that gamma irradiation of an impregnated carbon for gas masks results in substantially higher chemisorption capacity (min/ml filter mass), which is surprising. Retention of chloropicrin, typical of physical adsorption, did not increase, however, as the carbon retained its capacity for chloropicrin from before the irradiation.

According to one feature of the invention the carbon is irradiated in an atmosphere containing nitrogen. For reasons unknown nitrogen seems to be required for achieving increased chemisorption by irradiation of carbon.

In most experiments the applicant has employed impregnated carbon of the type "ASC-12 × 30, Pittsburg Activated Carbon" (produced by Chemviron). Carbons containing different amounts of impregnating materials were employed, here designated Type A and Type B. Type A had been stored for two to three years in an open drum. Type B was freshly procured from the manufacturer in a sealed container.

The impregnating materials consisted in both cases of basic copper carbonate, silver nitrate, and chromium oxides, in addition to ammonia.

Analysis of these impregnating materials revealed that Type A was somewhat less rich than Type B, see Table 1.

Table 1

|  | Type A | Type B |
|---|---|---|
| Cu, total percent | 5.4 to 7.0 | 6.2 to 7.8 |
| Cr. total percent | 2.0 to 2.1 | 2.4 to 2.6 |

The invention will be more closely described by the following examples.

EXAMPLE NO. 1

Active carbon of Type A, impregnated with 7.0% Cu, 2.1% Cr, and 0.05% Ag, was irradiated with gamma for 59 hours, corresponding to a dosage of 43 Megarad. This is equivalent to a dosage rate of 725 kilorad per hour. A sealed bottle of polyethylene containing 150 ml granulate of this carbon was placed in the radiation field. Its distance from the source was 6 cm. The radiation atmosphere was dry air, at a temperature around 20°C. The particle size of the granulate corresponded to 0.59 mm (78%) and 0.42 mm (21%), (between 20 and 35 mesh). The radiation source was Cobalt 60. It emits two gamma quanta, with energies of 1.33 Mev and 1.17 Mev, respectively, by disintegration.

The activity of the radiation source was at 32300 Curie at the start of the experiment. It consisted of seven cylindrical rods, each 20 cm long, mounted horizontally. The radiation dosage was checked with a Friecke dosimeter.

After radiation the carbon was stored for about 48 hours in a polyethylene container before it was tested for cyanogen chloride capacity.

Irradiated granulate (76 ml) was placed in a filter container. Cyanogen chloride gas was supplied to the filter at a rate of 72 ± 3 mg gas in 30 l of dry air per minute. This mixture was thermostatically controlled at 18° ± 0.5°C. The penetration time (in minutes) for cyanogen chloride is a measure of the filter capacity. Penetration time is here defined as the time elapsed, from the moment the cyanogen chloride gas is supplied to the filter entrance, to the moment the gas may be detected at the filter exit.

In the present case the penetration time was measured to be 20.5 min. Capacity may be defined as penetration time per unit volume of filter material. For the irradiated material this would be 0.27 min/ml. The capacity of the original non-irradiated product was measured to be 0.18 min/ml.

To detect penetration of cyanogen chloride one conducted one sixth of the air stream across a tray containing an indicator solution. The vertical distance between the filter exit and the tray was 2 cm. The tray contained 0.5 ml of fresh dimedone solution, having been prepared as follows: 1 mg of dimethyldehydroresorcinol was dissolved in 90 ml pyridine p.a. and 10 ml of distilled water was added. The indicator consisted of 0.5 ml of this solution. Penetration of cyanogen chloride will color this solution pink. The penetration time is defined by the moment from which this coloration would be complete in 20 seconds, the color intensity then being identical to the pink color of a standard solution. Said standard solution contains the following: 0.15 mg "Sudan" red, and 0.12 mg para toners, dissolved in 100 ml pyridine.

EXAMPLE NO. 2

A series of experiments were carried out under the same general experimental conditions as in Example no. 1, except that the radiation dosage was varied within the range of 1 to 100 Mrad. Conditions and results are shown in Table 2.

Table 2

Cyanogen chloride retention of gamma-irradiated "ASC active carbon type A".

| Experiment no. | Gamma irradiation dosage Mrad | Irradiation atmosphere | Relative humidity % | Filter volume ml | Penetration time min. | Capacity min/ml | Capacity gain* % |
|---|---|---|---|---|---|---|---|
| 1 | 0 | — | 0 | 61 | 11.0 | 0.180 | |
| 2 | 1 | air | 0 | 68 | 14.0 | 0.205 | 6.2 |
| 3 | 5 | air | 0 | 72 | 16.0 | 0.223 | 15.5 |
| 4 | 10 | air | 0 | 65 | 15.5 | 0.239 | 23.8 |
| 5 | 43 | air | 0 | 76 | 20.5 | 0.270 | 40.0 |
| 6 | 100 | air | 0 | 65 | 18.0 | 0.277 | 43.5 |

*Capacity gain as compared with non-irradiated material, experiment no. 1.

EXAMPLE NO. 3

Experiments analogous to those of Examples 1 and 2 were carried out on impregnated carbon of somewhat higher Cu—Cr content. Percentagewise the impregnating mixture corresponded to carbon of Type B. Table 1. Conditions were otherwise like those of Example no. 2. Table 3 shows conditions and results.

Table 3

Cyanogen chloride retention of gamma-irradiated "ASC active carbon, type B".

| Experiment no. | Gamma irradiation dosage Mrad | Irradiation atmosphere | Relative humidity % | Filter volume ml | Penetration time min. | Capacity min/ml | Capacity gain[r] % |
|---|---|---|---|---|---|---|---|
| 1 | 0 | air | 0 | 65 | 15.5 | 0.238 | 0 |
| 2 | 20 | air | 0 | 68 | 16.5 | 0.242 | 1.6 |
| 3 | 40 | air | 0 | 70 | 18.0 | 0.256 | 7.5 |
| 4 | 43 | air | 0 | 76 | 24.0 | 0.316 | 32.8 |
| 5 | 75 | air | 0 | 68 | 26.0 | 0.384 | 61.2 |
| 6 | 100 | air | 0 | 67 | 27.0 | 0.400 | 68.2 |

[r]Capacity gain as compared with non-irradiated material, experiment no. 1.

EXAMPLE NO. 4.

Gas mask filters, volume 180 ml, as packaged by the producer and insulated by aluminium foil, were irradiated by a $Co^{60}$ source.

The filters were Norwegian made, type designation NM 21. They had been filled with impregnated active carbon of type "Norit RG 0.8." The impregnating material contained the following: Cu 4.9%, Cr 3.3%, Ag 0.04%.

Following irradiation the filters were tested for cyanogen chloride capacity. Experimental conditions were the same as described in Example no. 1, with the exception that the moisture was kept at 75% R.H.. Table 4 shows experimental conditions and results, together with results obtained with non-irradiated filters.

Table 4

| Experiment no. | Irradiation dosage Mrad | Irradiation atmosphere | Relative humidity % | Filter volume ml | Penetration time min. | Capacity min/ml | Capacity gain[r] % |
|---|---|---|---|---|---|---|---|
| 1 | 0 | air | 75 | 180 | 72 | 0.400 | 0 |
| 2 | 50 | air | 75 | 180 | 79 | 0.439 | 9.7 |
| 3 | 100 | air | 75 | 180 | 84 | 0.466 | 16.6 |

[r]Capacity gain as compared with the original non-irradiated filter, experiment no. 1.

EXAMPLE NO. 5

Table 5 shows how the atmosphere of the irradiation stage influenced the cyanogen chloride capacity of the impregnated carbon (min/ml filter mass). All samples had received a radiation dosage of 50 Mrad. Before irradiation all samples were flushed for half an hour with the respective gas.

According to Table 5 irradiation of carbon in a nitrogen atmosphere before adsorption of cyanogen chloride produced the largest gain in capacity.

EXAMPLE NO. 6.

Active carbon granulate of type A, Table 1, was irradiated with 50 Mrad in a steel container. The container and the active carbon had previously been evacuated at room temperature for about 20 minutes to about 0.1 mm Hg pressure, whereupon pure nitrogen gas (99.9%) was supplied to the container to bring the pressure back to one atmosphere. The container was placed next to a source of gamma radiation ($Co^{60}$) as described in Example no. 1. The temperature during this stage was about 20°C. Upon irradiation the active carbon was transferred to a polyethylene bottle in nitrogen atmosphere and kept for about three days before it was tested for hydrogen cyanide capacity.

A 79 sample of the irradiated granulate (12 × 30 mesh) was placed in a filter container with 30 cm² area. Air was supplied to the filter at 30 l per minute. The concentration of hydrogen cyanide in this air was 1.38 mg/l. Its relative humidity was about 75% R.H., corresponding to a dosage of 340 to 360 mg $H_2O$ per minute. This gas mixture was kept at 18° ± 0.5°C by thermostatic control. The penetration time was defined as in Example no. 1.

For the present case the penetration time was measured to be 33 minutes. Capacity may be defined as the retention by chemisorption of hydrogen cyanide (mg)

Table 5

| Experiment no. | Irradiation dosage Mrad | Irradiation atmosphere | Relative humidity % | Filter volume ml | Penetration time min. | Capacity min/ml | Capacity gain[r] % |
|---|---|---|---|---|---|---|---|
| 1 | 0 | air | 0 | 61 | 11 | 0.18 | 0 |
| 2 | 50 | He | 0 | 65 | 11 | 0.17 | 0 |
| 3 | 50 | $O_2$ | 0 | 69 | 12.5 | 0.18 | 0 |
| 4 | 50 | air | 0 | 68 | 17.5 | 0.25 | 38.9 |
| 5 | 50 | $N_2$ | 0 | 72 | 19.5 | 0.27 | 50 |

[r]Capacity gain relative to the non-irradiated material of experiment no. 1.

per unit volume of filter mass. In this way one arrives at 17.3 mg HCN/ml. The capacity of non-irradiated original product was similarly measured to be 16 mg HCN/ml, which means that irradiation of the granulate raised the capacity by 8.1%.

Detection of hydrogen penetration was done by conducting the gas emerging from the filter towards strips of filter paper, which had been moistened by a solution consisting of equal parts by volume of 0.28% copper acetate solution and benzidine acetate solution. Penetration of hydrogen cyanide colored the filter blue.

The concentration of hydrogen cyanide in the gas was measured by conducting the gas stream, before filtering, through an absorption tower containing one liter of a solution of 54 g $HgCl_2$ and 72 g KBr in distilled water. To this solution was added one ml of 0.2% methyl red in 60% ethanol and 3 ml of 0.1% bromcresol green in 20% ethanol. A few ml of 0.1 Normal soda lye were also added. Hydrogen cyanide gas would color this complex mixture wine red. When this happened, a stop watch was started while simultaneously a certain amount, N of 0.1 Normal soda lye was added. The watch was stopped when the color once more turned wine red, and the time recorded.

Calculation of the hydrogen cyanide concentration C (mg per $m^3$ of gas) is done according to the formula:

$$C = \frac{N \cdot H \cdot 27000}{V \cdot t} \text{ (mg/m}^3\text{)}$$

where:
H = the concentration of soda lye, mole/l,
N = the volume of the soda lye, ml,
V = air velocity, l/min,
t = time, min.

Measurements of the hydrogen cyanide concentration were carried out before and after testing the capacity of the filters. Said concentration of 1.38 mg/ml was thus the average of the two.

EXAMPLE NO. 7

Active carbon impregnated with potassium carbonate, corresponding to a potassium content of about 14% was irradiated with a gamma dosage of 40 Megarad. The radiation source and the rate were the same as described in Example no. 1. A 40 ml sample of this carbon granulate was irradiated in nitrogen atmosphere in a polyethylene bottle, at a temperature of about 20°C.

The particle size of the granulate, being of the type "Dräger E 900" for use in gas masks, corresponded to 1.2 mm (50 vol %) and 1.7 mm (50 vol %).

Upon irradiation the carbon was kept for about 72 hours in a nitrogen atmosphere in the container. It was tested with regard to capacity for sulfur dioxide.

The granulate (40 ml) was placed in a filter container of glass under thermostatic control. The layer was 6.6 cm high and the filter cross section 6.0 $cm^2$. Every minute the filter was supplied with 103.4 mg of sulfur dioxide gas mixed with 15 l of dry nitrogen gas (99.9% pure). This corresponds to a sulfur dioxide concentration of 0.25% by volume. It is a typical contamination level in gaseous effluents. Thus the sulfur dioxide concentration in effluents from coal-burning power stations ranges between 0.05% and 0.3% by volume. The gas mixture and the filter were thermostatically controlled at 15° ± 0.5°C.

By determining the penetration time (minutes) for sulfur dioxide a measure of the filter capacity is achieved. This penetration time is defined (in analogy with Example no. 1) as the time elapsed between applying the sulfur dioxide gas to the filter input and detecting it at the filter output. For the present case the penetration time was measured at 11.25 minutes, corresponding to a capacity of 0.281 minutes per ml of filter mass. The original non-irradiated product was measured at 0.257 min/ml. The latter figure was the average of five measurements at relative standard deviation of ± 2.5%.

Penetration of sulfur dioxide was detected by conducting 1/15 of the streaming gas through an indicator tube, type "Dräger $SO_2$, 20/a, nr. 242." The tube was filled with a yellow salt which is colored white by penetration of sulfur dioxide. The tube had been graduated in concentration zones from 20 ppm to 200 ppm (1 ppm = 1 mg $SO_2$/kg of gas). The penetration time was defined at the moment when the 20 ppm zone had been colored completely white. The capacity gain in the present case is 9.3%.

EXAMPLE NO. 8.

A series of experiments were carried out under the same general conditions as in Example no. 7, except for the irradiation dosage and atmosphere. Experiments 2 through 5 were done with irradiation in air, while a nitrogen atmosphere was used with experiments 6 through 10. Relative humidity was 0% and gas pressure during irradiation 1 kg/$cm^2$. Other experimental conditions, and the results, have been recorded in Table 6.

The table reveals that a larger increase in capacity is achieved after irradiation in a nitrogen atmosphere than after irradiation in air.

It also reveals that larger dosage provides higher capacity in both cases.

Table 6

Sulfur dioxide retention of gamma-irradiated active carbon impregnated with potassium carbonate.

| Experiment no. | Gamma irradiation dosage Mrad | Irradiation atmosphere | Filter volume ml | Penetration time min. | Capacity min/ml | Capacity gain* % |
|---|---|---|---|---|---|---|
| 1 | 0 | — | 40.4 | 10.35 | 0.257** | 0 |
| 2 | 20 | air | 41.0 | 10.75 | 0.262 | 1.9 |
| 3 | 40 | air | 40.0 | 11.00 | 0.268*** | 4.2 |
| 4 | 75 | air | 41.0 | 11.25 | 0.274 | 6.6 |
| 5 | 100 | air | 40.0 | 11.75 | 0.294 | 14.3 |
| 6 | 20 | $N_2$ | 41.0 | 10.75 | 0.262 | 1.9 |
| 7 | 40 | $N_2$ | 40.0 | 11.25 | 0.281 | 9.3 |
| 8 | 50 | $N_2$ | 40.0 | 11.25 | 0.281 | 9.3 |
| 9 | 75 | $N_2$ | 43.0 | 12.81 | 0.296 | 14.9**** |
| 10 | 100 | $N_2$ | 41.0 | 12.75 | 0.311 | 21.0 |

*Capacity gain as compared with non-irradiated material, experiment no. 1.
**Capacity of the original material. AVerage of 5 measurements. Relative standard diviation ± 2.5%.
***Average of 2 measurements.
****Average of 3 measurements.

EXAMPLE NO. 9.

Carbon impregnated with Cu, Cr and Ag does not generally absorb gaseous CO and thus is not in protection masks for this purpose.

In gas masks for protection against CO gas it is used a sorbent with the designation Hopcalit. This is an oxide-peroxide mixture of the metals Cu, Mn, Co and Ag. This mixture oxidizes Co to $CO_2$. Thus it appears to be of importance to be able to combine the above absorption of toxic gases and the CO absorption in the same type of sorbent. To investigate this possibility active carbon granulate of Type B was irradiated in a nitrogen atmosphere to a dosage of 50 Mrad. A 40 ml sample of this irradiated carbon was placed in nitrogen in a glass filter container, as described in Example no. 7. Every minute this filter was supplied with a mixture of 5 ml (6.25 mg) CO and 2750 ml pure nitrogen gas. This corresponds to a CO consentration of 0.18% by volume, or 1800 ppm CO. One fifth of the gas stream was conducted to an indicator tube of type Dräger CH 28900. The indicator mass consisted of a mixture of iodine pentoxide and selenium dioxide treated with fuming sulfuric acid. Penetration of CO would cause the indicator to change color from white to brownish green. The tube had been graduated in concentration zones from 10 to 300 ppm (1ppm CO equals 1.17 mg CO per $m^3$ of gas). The penetration time was defined at the moment when the 50 ppm zone had been colored completely brown, in analogy with Example no. 7.

The penetration time was recorded to be 5.0 minutes, which corresponds to a capacity of 0.125 min/ml of filter mass, or approximately $(6.25 \cdot 0.125) = 0.78$ mg of CO per ml of filter mass. With non-irradiated original product one achieved a capacity of 0.107 min/ml, corresponding to 0.67 mg of CO per ml of filter mass. The latter capacity was an average of five measurements with a relative standard deviation of ± 4.2%. The gain in capacity was 16.8% in this case.

EXAMPLE NO. 10

A series of experiments were conducted under the same general conditions as in Example no. 9, with the exception of the radiation dosage and atmosphere. Experiment no. 2 was done with irradiation in air, while for nos. 3 and 4 the irradiation atmosphere was nitrogen. Relative humidity was 0% and gas pressure 1 $kg/cm^2$. Other conditions, and the results, are recorded in Table 7.

This is typical gas sorption carbon.

The BPL carbon was impregnated with a solution of 100 g copper chloride, CuCl, in one liter of 25% ammonia solution. A total of 250 ml of granulate was treated with this solution for three hours. The solution was then separated from the carbon, which was dried by flushing with nitrogen according to the following shedule: 5 minutes at room temperature, followed by 5 hours at 70°C, and finally for 2 hours at 120°C. The impregnated carbon was analyzed for copper by atomic absorption techniques, showing 4.7% Cu, or 7.25% CuCl. The carbon was irradiated in nitrogen to a dosage of 50 Mrad.

A sample of 40 ml of impregnated granulate was measured with regard to CO retention as described in Example no. 9, and the penetration time for CO gas was recorded in analogous manner, using the same type of indicator tube. The penetration time was recorded at 8.5 minutes, corresponding to a capacity of 0.212 min/ml. Non-irradiated CuCl impregnated carbon was recorded at 7.5 minutes or 0.187 min/ml, respectively. The capacity gain was 13.3%. For comparison, the corresponding figures for non-irradiated, nom-impregnated BPL carbons were measured to be 4.5 minutes or 0.166 min/ml.

EXAMPLE NO. 12

Active carbon of type Pittsburg BPL was impregnated with 7.5% potassium fluoride. A total of 250 ml of this impregnated carbon was irradiated to a dosage of 50 Mrad in nitrogen. A sample of 18.5 g of this irradiated sorption material was placed in a glass filter container. Filter volume was 43 $cm^3$ with a layer thickness of 7 cm. A stream of nitrogen gas, containing 1.34% Xe by volume, was recirculated over the impregnated carbon until sorption equilibrium was achieved between the gas phase and the sorbent material, which required 85 minutes.

The temperature was kept at 21°C. In order to analyze the Xe, a radioactive tracer, $Xe^{133}$, was added to the gas at 0.5 $\mu Ci/cm^3$. $Xe^{133}$ emits gamma rays with characteristic energy of 0.08 MeV. and half life of 5.65 days. By measuring the $Xe^{133}$ radiation a measure for the gas phase concentration of Xe is achieved. The total amount of Xe in the system was 4.4 ml. In the present case 23.3% Xe was retained on the sorbent material. This corresponds to a gain of 37% with respect to the non-irradiated KF-impregnated sorbent material.

Table 7

Carbon monoxide retention of gamma-irradiated active carbon, Type B.

| Experiment no. | Gamma irradiation dosage Mrad | Irradiation atmosphere | Filter volume ml | Penetration time min | Capacity min/ml | Capacity gain[x] % |
|---|---|---|---|---|---|---|
| 1 | — | — | 40 | 4.35 | 0.107[xx] | — |
| 2 | 50 | air | 41 | 4.37 | 0.106 | 0 |
| 3 | 50 | $N_2$ | 40 | 5.00 | 0.125[xxx] | 16.8 |
| 4 | 100 | $N_2$ | 40 | 7.25 | 0.181[xxx] | 69.0 |

[x]Capacity gain as compared with non-irradiated material, experiment no. 1.
[xx]Capacity of the original material. Average of 5 measurements. Relative standard deviation ± 4.5%.
[xxx]Average capacity of 4 measurements.

EXAMPLE NO. 11

The impregnated sorbent material employed in this example was a "Pittsburg" active carbon type BPL.

EXAMPLE NO. 13

The following experiment was carried out as described in Example no. 12, using BPL carbon impregnated with sodium fluoride (2.8% NaF). Irradiations took place in air and in nitrogen to dosages of 50 Mrad. Other conditions were the same as described in Example no. 12. The percentage sorption gain (retention of Xe on the sorbent material) relative to the non-irradiated, NaF-impregnated sorption material, was 40.0% for air and 51.5% for nitrogen.

EXAMPLE NO. 14

Kr was employed as sorption gas in this example, and $Kr^{85}$ as radioactive tracer. The gas contained a total of 0.059% krypton, the rest being nitrogen. The system used a total of 0.19 ml krypton and a tracer concentration corresponding to 0.5 $\mu$Ci $Kr^{85}/cm^3$. The carbon was the same type as described in Example no. 12. The material was irradiated to a dosage of 50 Mrad in nitrogen. A sorption gain of 13.4% was achieved as compared with the non-irradiated material.

It has surprisingly been found that by increasing the nitrogen pressure at constant gamma irradiation an increase in chemisorption capacity was obtained. Table 1 shows, among other things, that irradiation of impregnated carbon with a dosage of about 26 Mrad at 15 kg/cm² pressure of $N_2$ provided capacity gain exceeding that obtained with 50 Mrad irradiation at 1 kg/cm² pressure of $N_2$. This will reduce the irradiation costs, since these depend upon dosage.

Thus according to a feature of the invention, a procedure, for increasing the chemisorption capacity, with regard to poisonous gases or industrial gaseous effluents, of carbon impregnated with one or several metallic compounds, wherein the impregnated carbon before the chemisorption stage undergoes gamma irradiation to a dosage of at least 1 Mrad, as indicated above, is characterized by the irradiation being carried out at a partial pressure of nitrogen which is greater than the partial pressure of nitrogen in air at atmospheric pressure.

This feature will be more closely described by the following examples:

EXAMPLE NO. 15

Active carbon granulate of Type A described in example no. 1, was irradiated in a steel container to a dosage of 27 Mrad. Before irradiation the container with the active carbon was evacuated for about 20 minutes to around 0.1 mm Hg pressure. Pure nitrogen gas, 99.99%, was then used to fill the container to a pressure of 15 kg/cm². The container was placed at a source of gamma radiation ($Co^{60}$) as described in example no. 1. Upon irradiation the carbon was stored in a nitrogen atmosphere in a polyethylene container before testing its capacity with respect to cyanogen chloride.

A 75 ml sample of irradiated granulate was placed in a filter container. The capacity for cyanogen chloride was measured as described in example no. 1. In the present case the penetration time was recorded as 23 min., which means a capacity of 0.306 min/ml. The average capacity for 8 measurements with the non-irradiated original product was 0.197 min/ml. The capacity gain was 55.2% as compared with the original capacity.

EXAMPLE NO. 16

A series of experiments were carried out under the same general conditions as in example no. 15 with the exception of the radiation dosage which was kept at 50 Mrad, and the nitrogen pressure during irradiation which was varied within the range of 0.1 to 15 kg/cm². Experimental conditions and the results are contained in Table 8.

Table 8

Cyanogen chloride retention of gamma-irradiated ASC active carbon Type A in the presence of nitrogen gas.

| Experiment no. | Gamma irradiation dosage Mrad | Irradiation atmosphere | Nitrogen pressure during irrad. kg/cm² | Filter vol. cm³ | Penetration time min. | Capacity min/ml | Capacity gain[x] % | Remarks |
|---|---|---|---|---|---|---|---|---|
| 1 | 0 | — | — | 75 | 14.8 | 0.197[xx] | — | Original material |
| 2 | 50 | air | 0.75 | 68 | 17.5 | 0.257 | 30.4 | Exp. Table 5 appl. 2482/72 |
| 3 | 50 | $N_2$ | 1 | 72 | 19.5 | 0.270 | 37.1 | |
| 4 | 50 | $N_2$ | 3 | 75 | 20.6[xxx] | 0.274[xxx] | 39.1 | |
| 5 | 26 | $N_2$ | 15 | 75 | 23 | 0.306 | 55.3 | |

[x]Capacity gain as compared with non-irradiated original filter, experiment no. 1.
[xx]Capacity of non-irradiated original material. Average of 8 tests, relative standard deviation ± 8.7%.
[xxx]Average of 2 tests.

EXAMPLE NO. 17

Active carbon granulate Type A as described in Example no. 1, was irradiated in a steel container to a dosage of 50 Mrad. Prior to irradiation the container with the active carbon was evacuated for 20 minutes to a pressure of 0.1 mm Hg, and then filled with pure nitrogen gas (99.99%) to a pressure of 5 kg/cm². The container was placed at a source of gamma radiation ($Co^{60}$), as described in example no. 1.

Next the carbon was tested for hydrogen cyanide capacity, as described in example no. 6. The present experiment yielded a penetration time of 35 minutes, which means a capacity of 18.6 mg of HCN/ml, or a gain of 16.2%. The non-irradiated original material had a capacity of 16 mg HCN/ml.

EXAMPLE NO. 18

Some experiments were conducted under the same general experimental conditions as for Example no. 17, with the exception of the nitrogen pressure during irradiation, which was varied within the range of 1 to 15 kg/cm². Experimental conditions and the results are tabulated in Table 9.

Table 9

Hydrogen cyanide retention of gamma-irradiated ASC active carbon Type A.

| Experiment no. | Gamma irrad. dosage Mrad | Irradiation atmosphere | Pressure during irrad kg/cm² | Filter vol. ml | Rel. humid. % | HCN concentration mg/l | Penetration time min | HCN capacity mg/ml | Capacity gain[r] % |
|---|---|---|---|---|---|---|---|---|---|
| 1 | 0 | — | — | 75 | 75 | 1.43 | 28 | 16 | 0 |
| 2 | 50 | air | 1 | 78 | 75 | 1.39 | 27 | 14.4 | 0 (−10) |
| 3 | 50 | $N_2$ | 1 | 79 | 75 | 1.38 | 33 | 17.3 | + 8.1 |
| 4 | 50 | $N_2$ | 5 | 76 | 75 | 1.32 | 35 | 18.6 | +16.2 |
| 5 | 50 | $N_2$ | 15 | 75 | 75 | 1.25 | 45 | 22.4 | + 40 |

[r]Capacity gain as compared with non-irradiated material in Example no. 1 of patent application 2482/72.

EXAMPLE NO. 19

A 43 ml sample of gas mask carbon, impregnated with potassium carbonate, of type Drager 900 as described in Example no. 7, was irradiated in a steel container to a dosage of 40 Mrad. The container was filled with nitrogen to a pressure of 15 kg/cm². Upon irradiation the carbon was tested for sulfur dioxide capacity, likewise as described in Example no. 7. The penetration time was measured to be 12.5 minutes, which means a capacity of 0.291 min/ml. This is a capacity gain of 13.4% as compared with that of the original product, which was 0.257 min/ml.

EXAMPLE NO. 20

A series of experiments were carried out under the same general conditions as in Example no. 19, with exception of variable nitrogen pressure. Experimental conditions and the results are shown in Table 10.

EXAMPLE NO. 21

Measurements of the influence of pressure on carbon monoxide retention were made for the same general conditions as in Example no. 10. Table 4 shows the results, for a nitrogen irradiation atmosphere and a filter volume of 40 ml.

Table 11

Carbon monoxide retention of gamma-irradiated active carbon, type B.

| Experiment no. | Gamma irradiation dosage, Mrad | Pressure during irrad kg/cm² | Penetration time min. | Capacity min/ml | Capacity gain[r] % |
|---|---|---|---|---|---|
| 1 | 50 | 1 | 5.00 | 0.125 | 16.8 |
| 2 | 50 | 15 | 5.50 | 0.138 | 30.2[rr] |
| 3 | 100 | 1 | 7.25 | 0.181 | 69.0 |

[r]Capacity gain as compared with non-irradiated material.
[rr]Average of two measurements.

We claim:

1. A process for increasing the chemisorption capacity of carbon comprising:
   impregnating carbon with a quantity of at least one metallic compound effective for increasing the sorption capacity of the carbon; and
   irradiating said impregnated carbon with a dosage of at least 1 Mrad of gamma radiation in the presence of nitrogen.

2. A process as set forth in claim 1 wherein said irradiating step is conducted in an atmosphere having a nitrogen partial pressure greater than air at atmospheric pressure.

Table 10

Sulfur dioxide retention of impregnated active carbon irradiated with gamma radiation at various nitrogen pressures.

| Experiment no. | Gamma irrad. dosage Mrad | Irradiation atmosphere | Nitrogen pressure during irrad kg/cm² | Filter vol. cm³ | Penetration time min. | Capacity min/cm³ | Capacity gain[r] % | Remarks |
|---|---|---|---|---|---|---|---|---|
| 1 | 0 | — | — | 40.4[rr] | 10.35[rr] | 0.257[rr] | — | Exp. no.1 Table 6 Appl. 2482/72 |
| 2 | 40 | air | 0.75 | 41 | 11 | 0.268 | 4.2[rrr] | Exp.no.3 Table 6 appl. 2482/72 |
| 3 | 40 | $N_2$ | 1 | 40 | 11.25 | 0.281 | 9.3 | Exp. no.8, Table 6, appl. 2482/72 |
| 4 | 40 | $N_2$ | 15 | 43 | 12.5 | 0.291 | 13.4 | |

[r]Capacity gain as compared with non-irradiated original material.
[rr]Capacity of the original material. Average of 5 measurements, relative standard deviation ± 2.5%.
[rrr]Average of 2 measurements.

* * * * *